United States Patent [19]
Biggs et al.

[11] 3,988,496
[45] Oct. 26, 1976

[54] ETHYLENE-VINYL ACETATE-SILICONE RUBBER LAMINATES AND PREPARATION THEREOF

[75] Inventors: James W. Biggs, Lebanon; Lawrence A. Meeks, Cincinnati, both of Ohio

[73] Assignee: National Distillers and Chemical Corporation, New York, N.Y.

[22] Filed: Sept. 12, 1975

[21] Appl. No.: 612,890

[52] U.S. Cl. .............................. 428/383; 427/118; 427/387; 428/447
[51] Int. Cl.² ...................... B05D 7/20; B32B 27/08
[58] Field of Search ............ 427/118, 387; 428/383, 428/447

[56] References Cited
UNITED STATES PATENTS

| | | | |
|---|---|---|---|
| 3,108,898 | 10/1963 | Nitzsche et al. ................ | 427/387 X |
| 3,350,345 | 10/1967 | Vanderbilt et al. ............. | 427/387 X |
| 3,505,099 | 4/1970 | Neuroth ............................. | 428/447 |

*Primary Examiner*—James R. Hoffman
*Attorney, Agent, or Firm*—Kenneth D. Tremain

[57] ABSTRACT

Crosslinkable ethylene-vinyl acetate copolymer resins are rendered amenable to forming adherent laminates with cross-linkable silicone rubber by admixing the ethylene-vinyl acetate resin with certain selected silanes prior to adhering the resin to the silicone rubber.

20 Claims, No Drawings

ETHYLENE-VINYL ACETATE-SILICONE RUBBER LAMINATES AND PREPARATION THEREOF

BACKGROUND OF THE INVENTION

Electrical ignition wires are essentially comprised of a central conductor such as copper wire surrounded by an insulating material. Crosslinked silicone rubber is desirable as the insulating material because it has appropriate electrical insulating properties and provides resistance to degradation by oil, water, heat and atmospheric conditions encountered surrounding an internal combustion engine. Unfortunately the silicone rubber is relatively expensive and the stiffness and tensile strength properties of the crosslinked material on the copper conductor are inadequate for this application.

Ethylene-vinyl acetate resins have appropriate electrical insulating properties for use in ignition wires and have satisfactory mechanical strength properties. Since the ethylene-vinyl acetate resins do not have the same oil, water, heat and oxidative resistance characteristics as the crosslinked silicone rubber, it is apparent that an ignition wire having a central copper conductor surrounded by a crosslinked ethylene-vinyl acetate resin which in turn is surrounded by crosslinked silicone rubber would combine the desirable characteristics of the two polymer materials and overcome the foregoing problems. Unfortunately, the adhesion of crosslinked ethylene-vinyl acetate resins to crosslinked silicone rubber is marginal at best.

Accordingly, it is the object of this invention to provide a method by which the bonding of crosslinked ethylene-vinyl acetate resins to crosslinked silicone rubber is improved so that superior electrical insulated products can be achieved. This and other objects of the invention will become apparent to those skilled in the art from the following detailed description.

SUMMARY OF THE INVENTION

This invention relates to a method for improving the adhesion between crosslinked ethylene-vinyl acetate resins and cross-linked silicone rubbers and to the resulting electrical insulated products. More particularly, the invention relates to a method of improving the bonding of crosslinked ethylene-vinyl acetate to cross-linked silicone rubber by admixing the ethylene-vinyl acetate resins with a small amount of certain selected silanes prior to adhering the ethylene-vinyl acetate to the silicon rubber and prior to the crosslinking of the two plastic materials.

DESCRIPTION OF THE PREFERRED EMBODIMENTS

The ethylene-vinyl acetate resins and silicone rubber resin and the crosslinking agents therefor which are used in the present invention are well known in the art. Many such materials are commercially available and the individual identity of these materials does not constitute a feature of the present invention. Accordingly, they need not be described any further here.

In general, the ethylene-vinyl acetate and silicone rubbers are separately compounded with the usual fillers such as carbon black, clay, etc., and an appropriate crosslinking agent such as a peroxide. Layers of the two compounded resins are thereafter placed together or extruded such that one resin compound concentrically surrounds the other resin compound. The composite laminate is then cured by heating, under pressure, to an appropriate temperature at which the crosslinking is initiated.

It has been found that by compounding certain selected silanes with the ethylene-vinyl acetate resin, a satisfactory adhesion between the ethylene-vinyl acetate resin and the silicone rubber can be achieved after curing.

The particular silane adhesion promoting or bonding agents which have been found to be useful in the process are gamma methacryloxypropyl trimethoxysilane, vinyl triethoxysilane and the silanes manufactured by Dow Corning identified as Z-6032, Z-6020, Z-6040 and Z-6076, and having the formulas

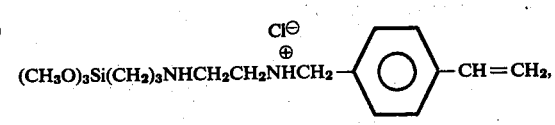

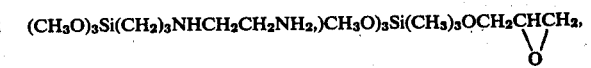

and $(CH_3O)_3Si(CH_2)_3Cl$, respectively. These silanes can be incorporated in an amount which can vary from 0.1 to 25 parts per hundred of the ethylene-vinyl acetate resin (phr). Since amounts of about 2 to 6 phr provide satisfactory adhesion, this level is preferred.

In a particularly preferred embodiment, the ethylene-vinyl acetate is sequentially compounded with vinyl-tris(beta methoxyethoxy)silane in a first stage and with gamma methacryloxypropyl trimethoxysilane, vinyl triethoxysilane or one of the Dow Corning silanes Z-6032, Z-6020, Z-6040 or Z-6076 in a second stage, prior to adhering the ethylene-vinyl acetate to the silicone rubber and crosslinking the resulting laminate, to provide long lasting adhesion. The vinyl-tris(beta methoxyethoxy)silane does not promote adhesive properties of the ethylene-vinyl acetate compounded resin to the silicone rubber compound when used alone but when used in conjunction with gamma methacryloxypropyl trimethoxysilane, vinyl triethoxysilane or one of the Dow Corning silanes Z-6032, Z-6020, Z-6040 or Z-6076, it not only promotes superior adhesion between the EVA compounded resin and the silicone rubber compound but also provides long lasting adhesion as well.

The first silane compound can be used in the same range of incorporation as the second added silane. Preferably, the vinyl-tris(beta methoxyethoxy)silane is used in amounts of about 1–3 parts per hundred parts ethylene-vinyl acetate resin.

The gamma methacryloxypropyl trimethoxysilane, vinyl triethoxysilane or Dow Corning silanes Z-6032, Z-6020, Z-6040 or Z-6076 appear to be specific in giving rise to adhesive properties when compounded with the ethylene-vinyl acetate resin. Attempts to achieve such properties with other additives have failed to be successful. For example, an ethylene-vinyl acetate resin containing 17% vinyl acetate and having a melt index of 1.5 was compounded with 3 phr of vinyl-tris(beta methoxyethoxy)silane and a peroxide. A silicone rubber was separately compounded with a peroxide crosslinking agent. Uncured plaques of each resin were then prepared, and the plaques pressed together and cured at 190°C. for 5 minutes. An attempt was made to measure the adhesive strength of one cured laminate on an Instron Peel Strength Tester but the adhesive strength was so poor that the values obtained were not meaningful. Thereafter the cured laminates were tested by hand and the adhesion rated as excellent, good, fair or poor. Similar tests in which the following additional fillers were added to the compounded ethylene-vinyl acetate resin did not show any improvement in the adhesion:

| Additional Component | Amount Added, phr |
|---|---|
| methyl-phenyl (7.5 mol percent) siloxane polymer | 5 |
| dimethylsiloxane tetramer | 5 |
| silicone rubber jacket compound | 10 |
| ethylene-vinyl acetate resin containing 50% vinyl acetate | 10 |
| benzoyl peroxide | 2 |
| calcium stearate | 1 |
| ethylene-vinyl acetate resin containing 60% vinyl acetate, fully hydrolyzed | 5 |
| silica (HiSil EP) | 50 |

Additionally, a cured laminate was prepared using an ethylene-vinyl acetate copolymer containing 17% vinyl acetate and having a melt index of 1.5 which had been compounded with 2 parts of vinyl-tris(beta methoxyethoxy)silane and the peroxide curing agent. No significant difference in the adhesion compared to the other laminates was noted.

In contrast to the foregoing results, satisfactory adhesive strength was obtained with the gamma methacryloxypropyl trimethoxysilane was used as a bonding agent. Thus, the foregoing described procedure was repeated using an ethylene-vinyl acetate resin containing 17% vinyl acetate and having a melt index of 1.5 which was compounded with the peroxide curing agent and either 2, 3 or 5 phr of the gamma methacryloxypropyl trimethoxysilane. The cured laminate exhibited good temporary adhesion.

The foregoing tests were also repeated using an ethylene-vinyl acetate copolymer resin containing 17% vinyl acetate and having a melt index of 1.5 which was compounded with vinyl-tris(beta methoxyethoxy)silane and the crosslinking agent in a first stage and with 3 phr of gamma methacryloxypropyl trimethoxysilane in a second stage. The adhesion of the cured laminate was excellent. This laminate was then subjected to a heat aging test in which it was maintained at 160°C. for 7 days. The adhesion remained excellent at the end of this period.

Various changes and modifications can be made in the process and products of this invention without departing from the spirit and the scope thereof. The various embodiments set forth herein were for the purpose of further illustrating the invention but were not intended to limit it.

We claim:

1. A method of improving the bonding of crosslinked ethylene-vinyl acetate to crosslinked silicone rubber which comprises admixing the ethylene-vinyl acetate with a silane bonding agent selected from the group consisting of gamma methacryloxypropyl trimethoxysilane, vinyl triethoxysilane,

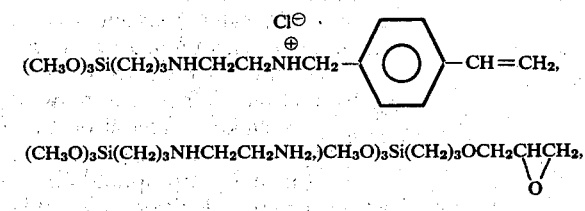

and $(CH_3O)_3Si(CH_2)_3Cl$ prior to adhering the ethylene-vinyl acetate to the silicone rubber and crosslinking the resulting laminate.

2. The method of claim 1 wherein said silane bonding agent is used in an amount of about 0.1 to 25 parts per hundred parts ethylene-vinyl acetate resin.

3. The method of claim 2 wherein said silane bonding agent is used in an amount of about 2–6 parts per hundred parts ethylene-vinyl acetate copolymer.

4. The method of claim 1 wherein the silane bonding agent is gamma methacryloxypropyl trimethoxysilane.

5. The method of claim 1 wherein the ethylene-vinyl acetate is mixed with vinyl-tris(beta methoxyethoxy)silane prior to admixing with said silane bonding agent.

6. The method of claim 5 wherein the vinyl-tris(beta methoxyethoxy)silane and said silane bonding agent are each employed in an amount of about 0.1–25 parts per hundred parts ethylene-vinyl acetate resin.

7. The method of claim 6 wherein the vinyl-tris(beta methoxyethoxy)silane is employed in an amount of about 1–3 parts per hundred parts ethylene-vinyl acetate resin and said silane bonding agent is employed in an amount of about 2–6 parts per hundred parts ethylene-vinyl acetate resin.

8. The method of claim 5 wherein the silane is gamma methacryloxypropyl trimethoxysilane.

9. The method of claim 8 wherein the vinyl-tris(beta methoxyethoxy)silane is employed in an amount of about 1–3 parts per part of gamma methacryloxypropyl trimethoxysilane.

10. A laminate comprising a crosslinked ethylene-vinyl acetate copolymer ply containing a silane selected from the group consisting of gamma methacryloxypropyl trimethoxysilane, vinyl triethoxysilane,

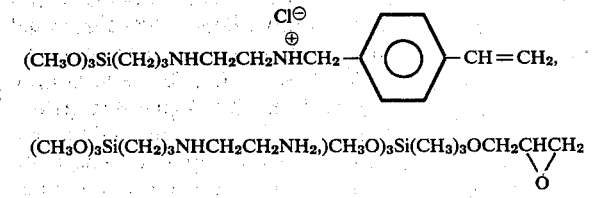

and $(CH_3O)_3Si(CH_2)_3Cl$ adhered to a ply of crosslinked silicone rubber.

11. The laminate of claim 10 wherein said silane is present in an amount of about 0.1 to 25 parts per hundred of ethylene-vinyl acetate.

12. The laminate of claim 11 wherein said silane is present in an amount of about 2–6 parts per hundred.

13. The laminate of claim 10 wherein said ethylene-vinyl acetate ply additionally contains vinyl-tris(beta methoxyethoxy) silane.

14. The laminate of claim 10 wherein the silane is gamma methacryloxypropyl trimethoxysilane.

15. An insulated electrical conductor comprising a central conductor, a first insulating material surrounding the central conductor and a second insulating material surrounding the first insulating material wherein said first insulating material is a crosslinked ethylene-vinyl acetate copolymer containing a silane selected from the group consisting of gamma methacryloxypropyl trimethoxysilane, vinyl triethoxysilane,

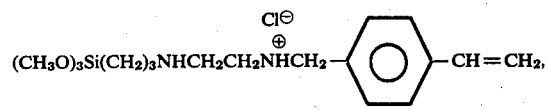

$(CH_3O)_3Si(CH_2)_3NHCH_2CH_2NH_2,) CH_3O)_3Si(CH_3)_3OCH_2\overset{\diagdown\;\diagup}{\underset{O}{CHCH_2}}$ and $(CH_3O)_3Si(CH_2)_3Cl$ and wherein said second insulating material is crosslinked silicone rubber.

16. The insulated ignition wire of claim 15 wherein said central conductor is copper.

17. The insulated conductor of claim 15 wherein said silane is present in an amount of about 0.1 to 25 parts per hundred parts of ethylene-vinyl acetate.

18. The insulated conductor of claim 17 wherein said silane is present in an amount of about 2–6 parts per hundred.

19. The insulated conductor of claim 15 wherein said ethylene-vinyl acetate ply additionally contains vinyl-tris(beta methoxyethoxy)silane.

20. The insulated conductor of claim 15 wherein the silane is gamma methacryloxypropyl trimethoxysilane.

* * * * *